United States Patent
Malagoli

(10) Patent No.: US 8,648,682 B2
(45) Date of Patent: Feb. 11, 2014

(54) MAGNET COIL ARRANGEMENT AND COLLECTION OF MAGNET COIL ARRANGEMENTS

(75) Inventor: Uber Malagoli, Reggio Emilia (IT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/540,223

(22) Filed: Jul. 2, 2012

(65) Prior Publication Data

US 2013/0168585 A1    Jul. 4, 2013

(30) Foreign Application Priority Data

Jul. 5, 2011    (DE) .......................... 10 2011 106 553

(51) Int. Cl.
  H01R 25/00    (2006.01)
  H01R 27/02    (2006.01)
  H01R 31/00    (2006.01)
  H01R 33/00    (2006.01)
  H01F 5/00     (2006.01)

(52) U.S. Cl.
  USPC .......................................... 335/299; 439/651

(58) Field of Classification Search
  USPC .................. 335/299; 439/649–651
  See application file for complete search history.

(56) References Cited

U.S. PATENT DOCUMENTS

| 3,109,124 | A | * | 10/1963 | Sinninger | 361/815 |
|---|---|---|---|---|---|
| 4,605,273 | A | * | 8/1986 | Horton | 439/369 |
| 4,671,600 | A | * | 6/1987 | Sawai et al. | 439/221 |
| 4,736,177 | A | * | 4/1988 | Vollmer et al. | 335/299 |
| 5,307,038 | A | * | 4/1994 | Ishimaru | 335/296 |
| 6,955,567 | B2 | * | 10/2005 | Inaba et al. | 439/651 |
| 7,138,895 | B2 | * | 11/2006 | Chung | 335/299 |
| 7,224,253 | B2 | * | 5/2007 | Chung | 335/299 |
| 7,902,949 | B2 | * | 3/2011 | Oh et al. | 335/299 |
| 8,013,705 | B2 | * | 9/2011 | Oh et al. | 336/107 |
| 2005/0042929 | A1 | * | 2/2005 | Ng | 439/651 |

FOREIGN PATENT DOCUMENTS

DE    78 29 256 U1    2/1979
DE    10 2008 023 951 A1    11/2009

OTHER PUBLICATIONS

Bosch Rexroth Oil Control S.p.A., Coils-Connectors, Data Sheet RE 18325-90, Feb. 2010, Germany (1 page).

* cited by examiner

*Primary Examiner* — Alexander Talpalatski
(74) *Attorney, Agent, or Firm* — Maginot, Moore & Beck

(57) ABSTRACT

A magnet coil arrangement for an electromagnetically operated valve includes a coil that is electrically connectable to a current source by means of a base. The base is constructed in substantially two parts by a coil part and a connection part. A current source can be connected to contacts of the connection part, while the coil part has contacts which are electrically connected to the coil. The connection part and the coil part are connected by means of a connecting apparatus in order to be electrically and mechanically connected.

13 Claims, 5 Drawing Sheets

MAGNET COIL ARRANGEMENT AND COLLECTION OF MAGNET COIL ARRANGEMENTS

This application claims priority under 35 U.S.C. §119 to patent application no. DE 10 2011 106 553.2, filed on Jul. 5, 2011 in Germany, the disclosure of which is incorporated herein by reference in its entirety.

The present disclosure relates to a magnet coil arrangement and to a collection of magnet coil arrangements for electromagnetically operated hydraulic valves.

BACKGROUND

Data sheet RE 18325-90/02.10 from Rexroth discloses magnet coil arrangements of this kind. A respective magnet coil arrangement has a coil which is provided with a winding and is encapsulated in plastic. In order to electrically connect the coil to a current source, the coil has a base with an electrical connection, wherein the base is integrally connected to the coil. The magnet coil arrangement is disclosed in the data sheet in a large number of embodiments, with different sizes, supply voltages and connections. The magnet coil arrangement is available, in particular, in sizes S8, S5, S7, R5, R7, with the supply voltages 12 V-DC, 24 V-DC, 26 V-DC, 24 V-AC, 110 V-AV, 230 V-AC and with the following connections for the current source: DIN 43650, single lead, Amp Junior, Amp Superseal, Deutsch DT-04. If the magnet coil arrangement is used with an alternating current source, rectifiers in form of diodes are additionally required, these being integrated in the base.

One disadvantage of this is that the large number of different designs of the magnet coil arrangements lead to high production costs.

In contrast, the disclosure is based on the object of providing a magnet coil arrangement which can be produced in a simple and cost-effective manner. A further object of the disclosure is to provide a collection for a magnet coil arrangement, which collection likewise exhibits low production costs with a large variety of variants.

The object is achieved in accordance with the features of the magnet coil arrangement and in accordance with the collection of magnet coil arrangements described herein.

SUMMARY

According to the disclosure, a magnet coil arrangement for electromagnetically operated valves has an encapsulated coil. In order to make electrical contact with the coil, the coil can be connected to a current source by means of a base. In this case, the base is constructed in two parts by a connection part and a coil part, current paths for connecting the coil to the current source being formed in each of the parts. In this case, the current paths of the connection part can be electrically connected to the current source, and the current paths of the coil part, which is fixed to the coil, are electrically connected to the coil. The connection part can advantageously be electrically and mechanically connected to the coil part by means of a connecting apparatus.

This solution has the advantage that, in contrast to the prior art, the base is designed in two parts by a connection part and a coil part, which parts can be connected by means of a connecting apparatus. The connection part, which can be in the form of a DIN 43650, single lead, Amp Junior, Amp Superseal or Deutsch DT-04 for example, can therefore be produced completely independently of the base part which is connected to the coil. In contrast to the prior art, the coil part and the connection part can be produced by different manufacturers in this case, as a result of which the production costs are drastically reduced.

Furthermore, if, for example, the connection part is damaged, it is not necessary to replace the entire magnet coil arrangement but rather only the connection part.

In a further refinement of the disclosure, the connecting apparatus between the coil part and the connection part is standardized. This advantageously leads to it being possible for different connection parts and/or coil parts to be connected to one another, as a result of which the magnet coil arrangement can be produced in an extremely flexible and cost-effective manner.

The coil part advantageously has two contact elements which project, in particular, radially to the coil axis out of the coil part, wherein the contact elements can be connected in a force-fitting manner to two contact elements of the connection part by means of suitable means in order to make electrical contact with the current paths. As a result, it is not necessary to connect the contact elements in a costly manner by soldering or welding. Furthermore, the contact elements can be detached from one another in a simple manner when the base is removed.

Contact areas of the contact elements of the connection part are preferably larger than contact areas of the contact elements of the coil part. As a result, the connection part and the coil part can be arranged in a more flexible manner in relation to one another since the contact elements of the coil part can be connected to the contact elements of the connection part by means of a large surface region. Conversely, it is also possible for the contact areas of the coil part to be larger than those of the connection part. Furthermore, one contact area of the connection part and one contact area of the coil part could also be larger than that contact element of the other part with which contact is to be made in each case. The contact areas of the coil part and of the connection part are therefore of such a size that a relative displacement between the two parts with respect to one another leads to an interruption in the electrical contact only starting from a specific size of the displacement movement.

The contact areas of the contact elements of the connection part are preferably semicircular approximately in one plane. The contact areas are then arranged on a common ring radius. If the contact elements of the coil part are then, for example, in the form of contact lugs or in the form of contact pins, the respective contact element of the connection part can in each case make contact with these contact elements over the entire semicircular area.

The connection part and the coil part are preferably mechanically connected to one another by means of a cost-effective screw connection.

The connection part advantageously has one or more passage holes for screws to pass through and/or the coil part has one or more holes for the screw connection of the two parts. In this case, the passage holes and/or the holes are arranged in such a way that the connection part and the coil part can be screwed relative to one another in different positions.

In a further refinement of the disclosure, the holes in the coil part are arranged in a pitch circle which surrounds the contact elements. One passage hole in the connection part can then be assigned to a plurality of holes for screw connection purposes, wherein the coil part and the connection part can then be screwed, for example, relative to one another about a pitch circle axis in a plurality of positions.

A plurality of passage holes in the connection part can also be arranged in a pitch circle which surrounds the contact element of the connection part.

In order to hold the coil part and the connection part in an interlocking manner in at least one plane, the connection part has an outer collar which can be inserted substantially flush into a collar receptacle of the coil part. In this case, the contact elements of the connection part are preferably arranged within the outer collar and those of the coil part are preferably arranged within the collar receptacle.

In order, in particular, to preliminarily center the connection part on the coil part during assembly, a centering pin which can enter a hole in the coil part is formed in the outer collar of the connection part on that side which faces the coil part.

In order to protect the contact-making means against external influences, the connection part and the coil part are welded, in particular by ultrasound welding, in addition to or as an alternative to the screw connection.

In order to likewise protect against external influences, a sealing ring, in particular an O-ring, can be arranged between the connection part and the coil part.

A collection of above-described magnet coil arrangements is provided according to the disclosure. In this case, the coil parts are of different sizes and/or the connection parts have different electrical connections for the current source. In this case, the electrical and/or mechanical connection between the coil part and the connection part can be identical in all the magnet coil arrangements of the collection.

This advantageously leads to extremely low storage costs since, for example, one coil part can be connected to a plurality of connection parts, as a result of which the number of components to be stored which is required in order to provide a sufficient variety of variants falls drastically.

BRIEF DESCRIPTION OF THE DRAWINGS

The disclosure will be explained in greater detail below with reference to schematic drawings, in which.

DETAILED DESCRIPTION

Figure 1:
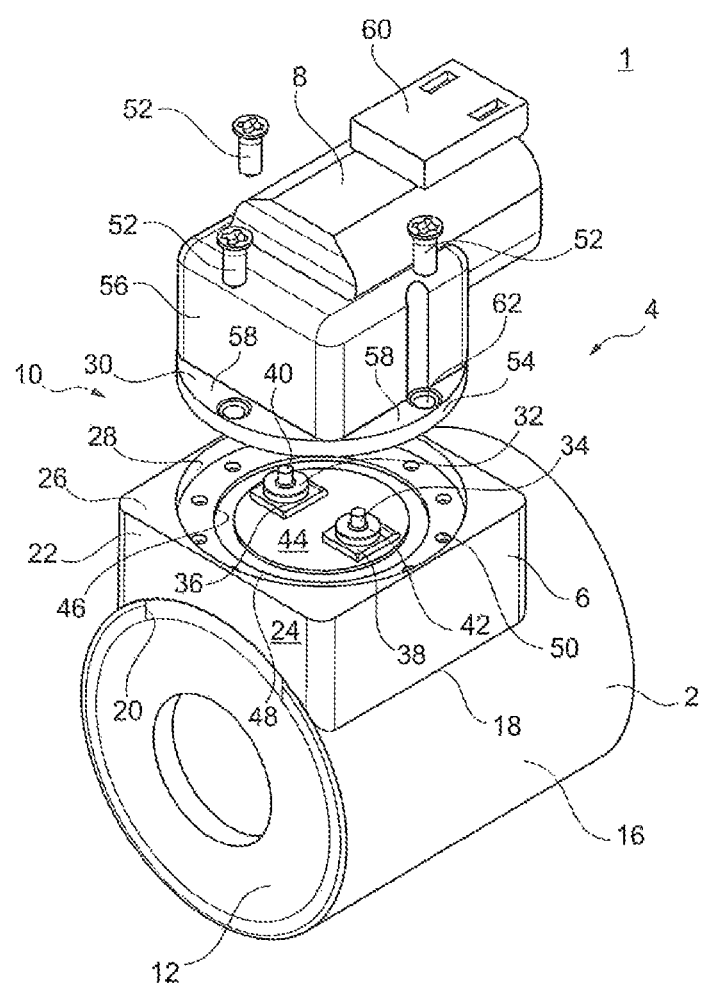
FIG. 1 shows a perspective illustration of a magnet coil arrangement according to a first exemplary embodiment.

FIG. 1 shows a perspective exploded illustration of a magnet coil arrangement 1 for electromagnetically operated hydraulic valves according to a first exemplary embodiment. The magnet coil arrangement has an encapsulated coil 2 with a base 4 for connecting the coil 2 to a current source. The base 4 has a coil part 6 which is firmly connected to the encapsulated coil 2 and a connection part 8 which can be connected to the coil part by means of a screw connection.

The coil part 6 and connection part 8 are mechanically connected to one another and make electrical contact with one another by means of a standardized connecting apparatus 10. On account of the standardization of the connecting apparatus 10, coils 2 of different designs can be connected to coil parts 6 with connection parts 8 of different designs. The coil 2 is of different sizes, for example S8, S5, S7, R5 or R7, in accordance with data sheet RD 18325-90/02.10 from Rexroth, for example. The supply voltage of the coil 2 can be, for example, 12 V-DC, 24 V-DC, 26 V-DC, 24 V-AC, 11 V-AV or 230 V-AC in this case. By way of example, the connections DIN 43650, single lead, Amp Junior, Amp Superseal or Deutsch DT-04 can be used in order to connect the coil 2 to a current source. In the prior art, the connections are integrally integrated in the magnet coil arrangement, as a result of which magnet coil arrangements of this kind have to be produced by a single manufacturer. On account of the separation of the base 4 into a coil part 6 and a connection part 8, which parts can be connected to one another by means of standardization, it is firstly possible to produce the coil 2 together with the coil part 6 independently of the connection part 8 and, furthermore, to form a specific coil type with different connections in a simple manner. The connection part 8 in FIG. 1 is designed as a Deutsch DT-04 connection part in this case.

The encapsulated coil 2 has a coil former (not illustrated) which is encapsulated in plastic. Furthermore, the coil 2 is approximately hollow-cylindrical and has two annular end faces 12 and 14. The coil former which is encapsulated in plastic is surrounded by a coil jacket 16 which is composed of metal. The base 4 having the coil part 6 is arranged approximately radially to a coil longitudinal axis of the coil 2. In this case, the coil part 6 has a lower face 18 which faces the coil 2, the cross section of the lower face, as seen transverse to the longitudinal direction of the coil 2, surrounding a pitch circle in portions, the radius of the pitch circle corresponding approximately to an outside radius of the coil jacket 16. The coil jacket 16 has a cutout 20 in the region of the lower face 18, the coil part 6 being connected to the encapsulated coil 2 by means of the cutout. A circumferential face 22 of the coil part 6 has a substantially square cross-sectional shape, wherein a front face 24 lies approximately in a plane with the annular end face 12 of the coil 2. A width of the front face 24 is somewhat smaller than an outside diameter of the coil jacket 16 in this case. A cutout 28 or collar receptacle which has a circular cross section is inserted into an upper face 26 of the coil part 6 which faces away from the coil 2, it being possible for an outer collar 30 of the connection part 8 to enter the cutout or collar receptacle. In this case, the upper face 26 extends transverse to the plane in which the annular end face 12 is arranged. Two contact elements 32, 34 which are electrically connected to the coil 2 project out of the upper face 26 within the cutout 28 in the coil part 6. The contact elements 32 and 34 are in the form of contact lugs which extend from the upper face 26, through the coil part 6, to the coil 2. End sections 36 and 38 of the contact elements 32 and 34, which are in the form of contact lugs, extend approximately parallel to the upper face 26 and are arranged in the region of a cutout base 44 of the cutout 28. The end sections 36 and 38 are at a distance from one another and have a plane of symmetry which is formed by the longitudinal axis of the coil 2 and a longitudinal axis of the cutout 28. A contact pin 40 or 42 is firmly arranged in a respective upper face of the end sections 36 and 38 of the contact elements 32 and 34 which faces away from the coil 2, the axes of the contact pin extending at a parallel distance from the longitudinal axis of the cutout 28. An annular cutout 46, which surrounds the end sections 36 and 38, for accommodating an O-ring is made in the cutout base 44. The cutout base 44 is subdivided into an external annular face 48 and an internal circular face by the annular cutout 46. Twelve holes 50 which lie in a pitch circle and of which only one is provided with a reference symbol in FIG. 1 for reasons of clarity, is made in the cutout base 44, originating from the annular face 48. The holes 50 serve to receive a screw 52 in order to screw the connection part 8 to the coil part 6.

The outer collar 30 of the connection part 8 has a substantially circular-cylindrical outer casing surface 54, the radius of which corresponds substantially to the radius of the cutout 28 in the coil part 6, as a result of which the outer collar 30 can enter the cutout in a flush manner. A height of the outer collar 30 corresponds approximately to a depth of the cutout 28, with the depth of the cutout being measured from the upper face 26 to the cutout base 44. A housing section 56 of the connection part 8, which housing section has an approximately square cross section, is formed on an upper face of the outer collar 30, as a result of which four collar areas 58 which are in the form of a segment of a circle are formed on the upper face of the outer collar 30, two of the collar areas being illustrated in FIG. 1. A plug socket 60 is formed in the housing section 56, the plug socket extending approximately transverse to the longitudinal direction of the connection part 8 and serving to connect a current source. In this case, the plug socket 60 covers a collar area 58 (not illustrated in FIG. 1) which is in the form of a segment of a circle. A passage hole 62 with a recess for the screws 52 to pass through is made approximately in the center of each of the other three collar areas 58. The passage holes 62 are therefore arranged in a pitch circle such that they are offset through approximately 90° with respect to one another.

Figure 2:
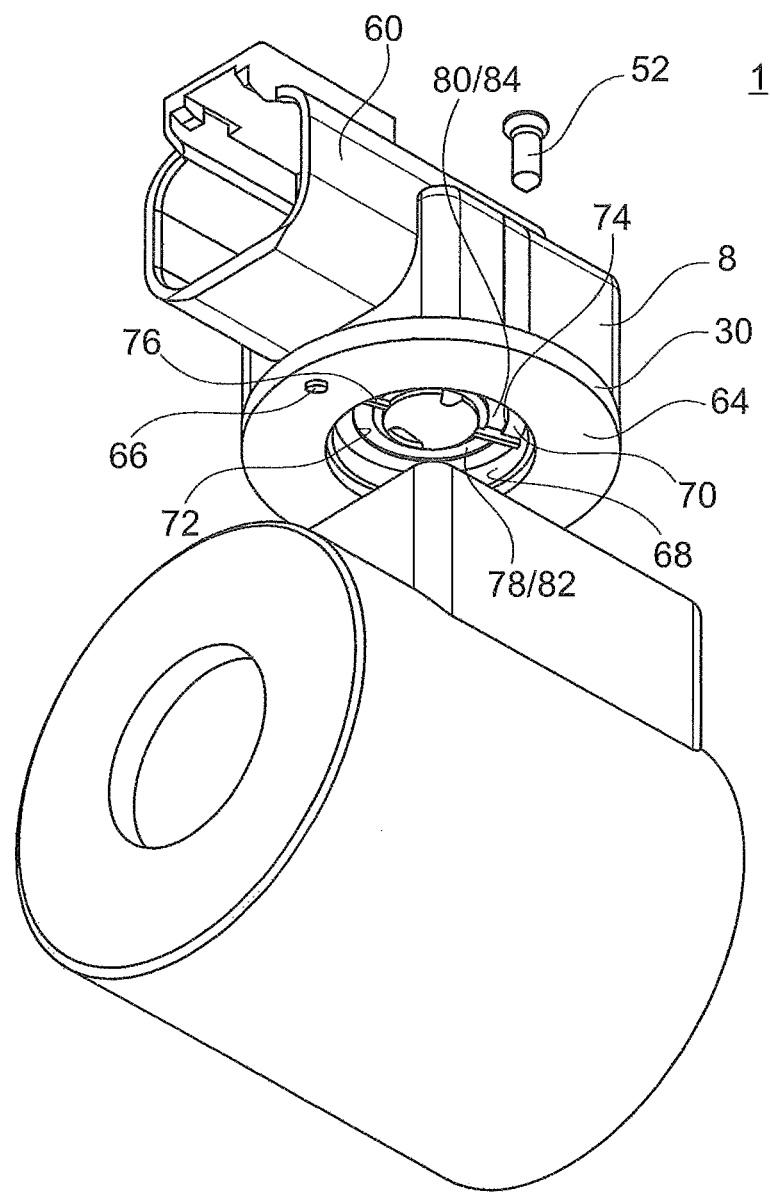
FIG. 2 shows a perspective illustration of the magnet coil arrangement according to the first exemplary embodiment.

FIG. 2 shows the magnet coil arrangement 1 in a perspective and exploded illustration approximately in a direction of a lower face 64 of the outer collar 30 of the connection part 8. The passage holes 62 from FIG. 1 are not illustrated in FIG. 2 for the sake of simplicity. A centering projection 66 is formed on the lower face 64, the centering projection entering a hole 50 in the coil part 6 from FIG. 1 in the state in which the connection part 8 is connected to the coil part 6, in order to fix the connection part 8 to the coil part 6 in a circumferential direction of the outer collar 30. The centering projection 66 is arranged on the pitch circle of the passage holes 62 from FIG. 1 in this case, wherein the centering projection is offset through 90° in relation to its adjacent passage holes 62 and is arranged on that section on the lower face 64 which faces away from the collar surface which is covered by the plug socket 60 and is in the form of a segment of a circle. The lower face 64 is in the form of a ring, wherein a ring width is selected such that the lower face 64 substantially rests on the annular face 48 and substantially covers the annular cutout 46 when the connection part 8 and the coil part 6 are in the assembled state, wherein an O-ring which is inserted into the annular cutout is held in a firm and sealing manner between the connection part 8 and the coil part 6.

A cutout 68 is made in the connection part 8, originating from the lower face 64. The cutout is formed substantially with a circular-cylindrical cross section. Two semicircular cutouts 72, 74 are made in the base surface 70 of the cutout 68, the cutouts each surrounding a pitch circle of the same radius, the center point of the pitch circle lying approximately in a longitudinal axis of the circular lower face 64. In this case, the cutouts 72, 74 are separated from one another by a web 76 which passes through the cutout 68 in an approximately diagonal manner. A height of the web 76 is substantially smaller than a depth of the cutout 68 in this case. A respective contact element 78 or 80 with a semicircular contact area 82 or 84 is inserted into each of the semicircular cutouts 72 and 74. A respective contact element 78, 80 extends through the connection part 8 to the plug socket 60, where a plug makes contact with the plug socket. When the connection part 8 and the coil part 6 are in the connected state, the contact pins 40 and 42 from FIG. 1 bear, by way of their end-face contact areas, against the contact areas 84 and, respectively, 82 and are connected to the contact areas in a force-fitting manner by the coil part 6 being mechanically firmly connected to the connection part 8 by the screws 52.

In order to connect the coil part 6 to the connection part 8, the connection part is placed, by way of its outer collar 30, into the cutout 68, wherein the parts 6 and 8 are arranged in relation to one another in such a way that the centering projection 66 enters one of the holes 50. The connection part 8 is then screwed to the coil part 6 by means of at least one screw 52. The connection part 8, together with its plug socket 60, can be arranged relative to the coil part 6 by the twelve holes 50, depending on the arrangement of the holes 50.

Figure 13:
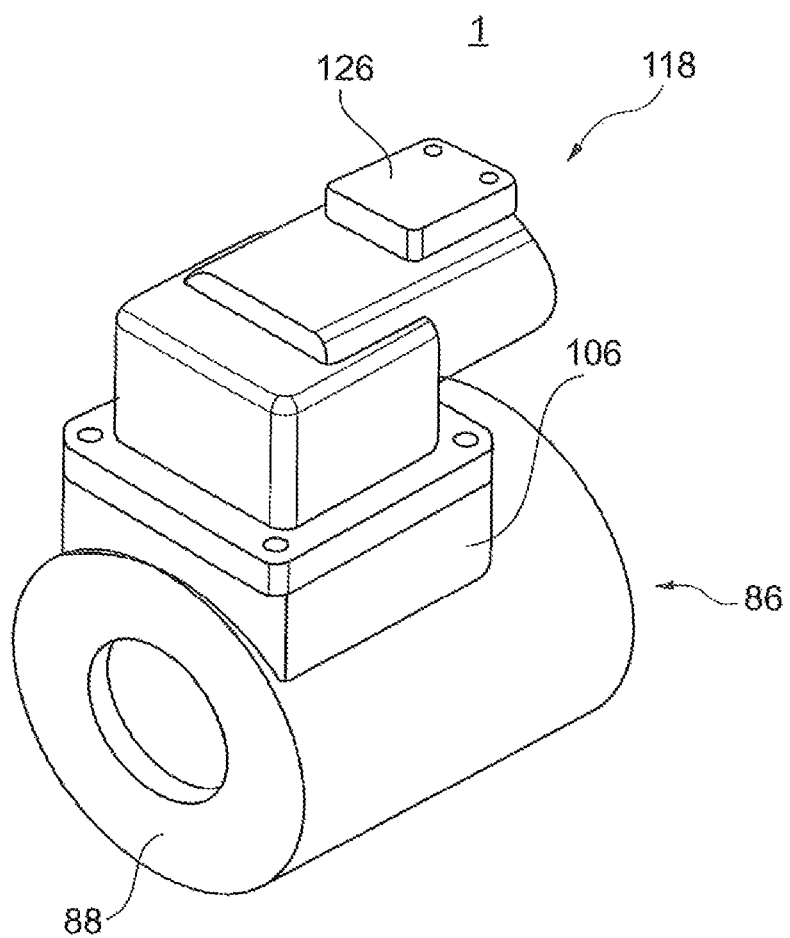
FIG. 13 shows a perspective illustration of the magnet coil arrangement according to the second exemplary embodiment.

FIGS. 3 to 12 disclose components of a second embodiment of a magnet coil arrangement, in each case in a perspective view, while FIG. 13 shows a perspective illustration of an assembled magnet coil arrangement 1 according to the second embodiment.

Figure 3:
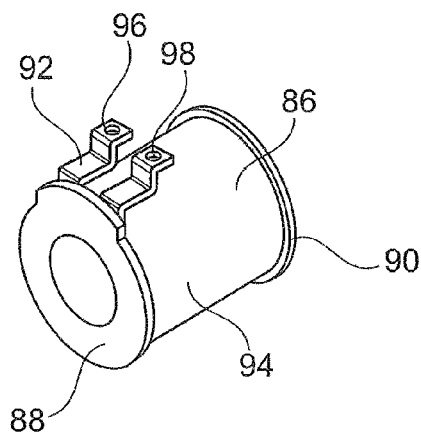
FIGS. 3 to 6 each show a perspective illustration of components of a coil part of the magnet coil arrangement according to a second exemplary embodiment.

FIG. 3 shows a perspective illustration of a coil former 86 which is provided with a winding. The coil former is bounded at the ends by a plastic ring 88 and 90 in each case. Two contact lugs 92, 94 or contact elements extend from a side of the plastic ring 88 which is at the front in FIG. 3, which side faces the winding, wherein a respective contact lug 92 or 94 is connected to a winding end of the winding. A respective contact lug 92 or 94 is bent three times, as a result of which a respective first section which is connected to the winding extends approximately transverse to the longitudinal direction of the coil former 86 and a respective end section extends away from the front plastic ring 88 approximately in the longitudinal direction.

Figure 4:
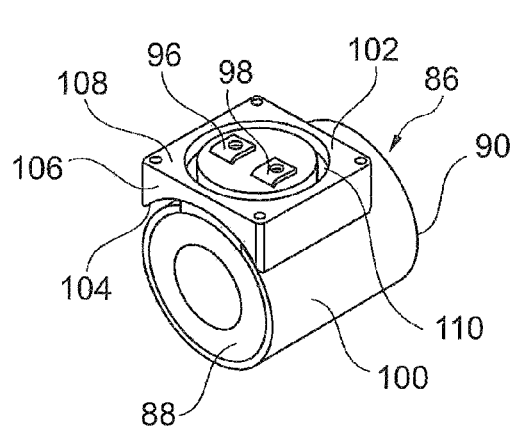

FIG. 4 shows a coil former 86 which is completely encapsulated in plastic and has a plastic jacket 100 which is bounded at the ends by the plastic rings 88 and 90. The plastic jacket is connected to a coil part 102 of a base. The coil part 102 has a lower face 104, which corresponds to the coil part 6 from FIG. 1, and an outer casing surface 106. The lower face 104 is positioned at a distance from the plastic jacket 100 by way of edge regions in sections and is firmly connected to the plastic jacket by means of a central region. The end sections 96 and 98 of the contact lugs 92 and, respectively, 94 from FIG. 3 project from an upper face 108 of the coil part 102, the end sections extending approximately parallel to the upper face 108 and substantially resting against the upper face. In this case, the end sections 96 and 98 are surrounded by an annular cutout 110 which is made in the upper face 108, the annular cutout serving for the insertion of an O-ring.

Figure 5:
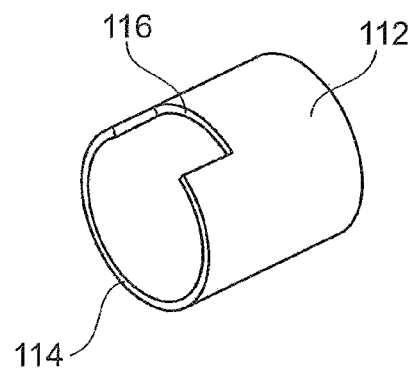

FIG. 5 shows a coil jacket 112 which corresponds substantially to the coil jacket 16 from FIG. 1. The coil jacket has a cutout 116, which is made originating from its annular end face 114 which is at the front in FIG. 5 and which has an approximately U-shaped circumferential wall having two areas which are opposite one another and extend approximately in the longitudinal direction, and an area which is situated at a parallel distance from the end face 114. When the rear plastic ring 90 of the coil former 86 is mounted, see FIG. 4, the coil jacket 112 is pushed in the direction of the front plastic ring over the plastic jacket 100, wherein the cutout 116 is arranged in the region of the lower face 104 of the coil part 102.

Figure 6:
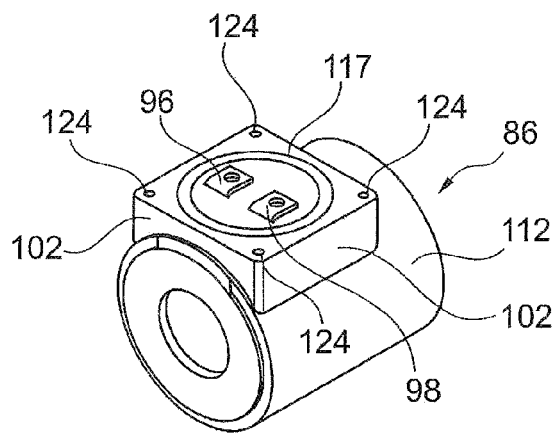

FIG. 6 shows a perspective illustration of the coil former 86 together with the coil jacket 112. In this case, the faces of the cutout 116 in the coil jacket 112 from FIG. 5 surround that section of the lower face 104 of the coil part 102 which is connected to the plastic jacket 100, while that section of the lower face 104 which is at a distance from the plastic jacket 100 rests substantially on the coil jacket 112. Furthermore, in FIG. 6, an O-ring 117 is inserted into the annular cutout 110 from FIG. 4.

Figure 7:
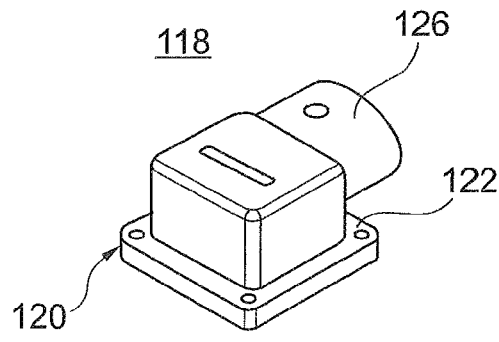
FIGS. 7 to 12 each show a perspective illustration of a connection part for the magnet coil arrangement according to the second exemplary embodiment.

FIGS. 7 to 12 each show a perspective illustration of a connection part 118 of a base, which connection parts have a standard connecting apparatus 120 by means of which the connection parts can be electrically and mechanically connected to the coil part 102 from FIG. 6. The connecting apparatus 120 has a substantially rectangular cross section, wherein a passage hole 122 is formed in each of the corner regions of the cross section, wherein only one passage hole 112 in the connection part 118 in FIG. 7 is provided with a reference symbol for better illustration. A respective passage hole 122 in the connection parts 118 can be arranged approximately coaxially to a respective threaded holes 124 in the coil part 102 from FIG. 6, the threaded holes being arranged substantially in the corner region of the coil part 102. Contact elements (not illustrated) are provided on lower faces of the connection parts 118 from FIGS. 7 to 12, the contact elements being designed in such a way that force-fitting contact is made by the end sections 96 and 98 of the contact lugs 92 and 94 from FIG. 6 in the mounted state. The contact elements are semicircular, for example in accordance with FIG. 2.

A respective connection part 118 can be screwed to the coil part 102 from FIG. 6 in four different positions.

Figure 8:
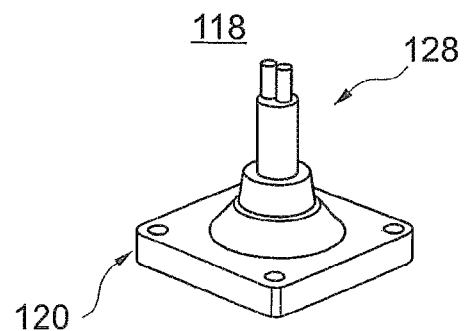
Figure 9:
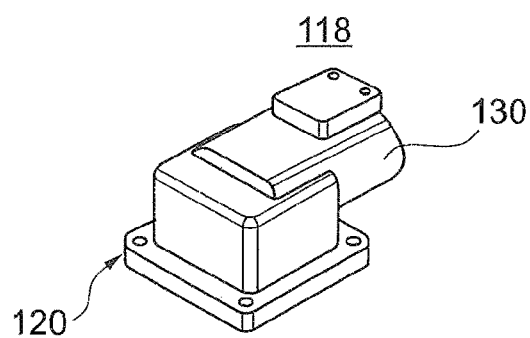
Figure 10:
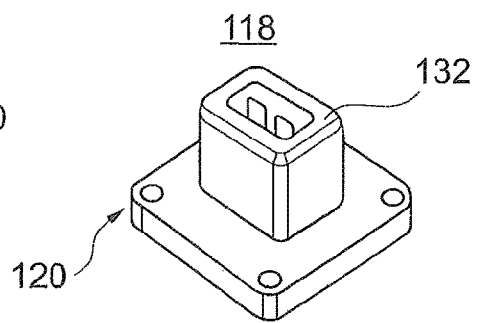
Figure 11:
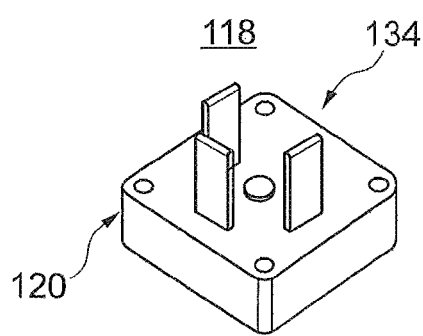
Figure 12:
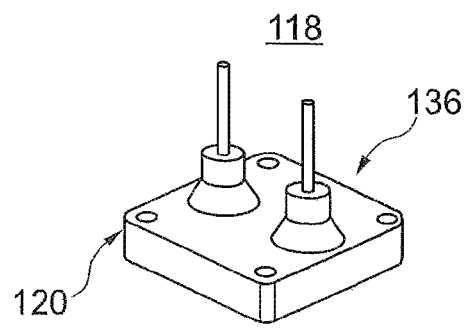

A connection 126 of the connection part 118 from FIG. 7 is in the form of an Amp Superseal. A connection 128 of the connection part 118 from FIG. 8 is a single lead. A connection 130 of the connection part 118 from FIG. 9 is in the form of a Deutsch DT-04. The connection 132 of the connection part 118 from FIG. 10 is an Amp Junior. A connection 134 (illustrated in FIG. 11) of the connection part 118 is in the form of a DIN 43650 in which an additional protective conductor connection is provided. The connection part 118 from FIG. 12 has a connection 136 which is formed with two current connections. The connection parts 118 of FIGS. 7 to 12 can have a diode if the coil which is electrically contacted by the connection parts is operated with an alternating current.

By virtue of the standardized connecting apparatus 120 of the connection parts 118, the connection parts can all advantageously be connected to the coil part 102 from FIG. 6. Therefore, for example six magnet coil arrangements with different connections can be provided in this case, wherein the coil part 102 is the same.

FIG. 13 shows the connection 118 in the state in which it is screwed to the coil part 106. In this illustration, the connection 126 faces away from the plastic ring 88 approximately in the longitudinal direction of the coil former 86. As already described above, the connection 126 can also be arranged opposite the shown direction or transverse to the direction.

The different connection parts 118 from FIGS. 7 to 12 together with the coil part 102 from FIG. 6 provides a collection of magnet coil arrangements. The connecting apparatus 120 of the magnet coil arrangements is identical.

The disclosure discloses a magnet coil arrangement for electromagnetically operated valves having a coil. The coil can be electrically connected to a current source by means of a base. In this case, the base is constructed in substantially two parts by a coil part and a connection part. A current source can be connected to contacts of the connection part, while the coil part has contacts which are electrically connected to the coil. The connection part and the coil part are connected by means of a connecting apparatus in order to be electrically and mechanically connected. The disclosure also provides a collection of magnet coil arrangements in which the coil parts of the base are of different sizes and/or the connection parts have different electrical connections for the connection of a current source. The electrical and/or mechanical connection between the coil part and the connection part is identical in all the magnet coil arrangements.

What is claimed is:

1. A magnet coil arrangement for electromagnetically operated valves comprising:
    an encapsulated coil which can be electrically connected to a current source by means of a base,
    wherein said base includes a connection part and a coil part,
    wherein current paths pass through the connection part and the coil part,
    wherein current paths of the connection part can be electrically connected to the current source, while current paths of the coil part, which is fixed to the coil, are electrically connected to the coil,
    wherein the coil part includes two contact elements projecting outward from the coil and the connection part includes two contact elements that are semicircular and arranged on a ring radius, and
    wherein the connection part and the coil part are connected by means of a connecting apparatus in order to be electrically and mechanically connected, the connecting means configured to permit variable rotational positions of the connection part relative to the coil part with the contact elements of each part in contact with each other.

2. The magnet coil arrangement according to claim 1, wherein the connecting apparatus is standardized.

3. The magnet coil arrangement according to claim 1, wherein the coil part has two contact elements which project approximately radially out of said coil part and are connected in a force-fitting manner to two contact elements of the connection part in order to make electrical contact with the current paths.

4. The magnet coil arrangement according to claim 3, wherein contact areas of the contact elements of the connection part are larger than contact areas of the contact elements of the coil part.

5. The magnet coil arrangement according to claim 3, wherein the contact elements of the coil part are contact lugs.

6. The magnet coil arrangement according to claim 1, wherein the connection part and the coil part are connected by means of a screw connection.

7. The magnet coil arrangement according to claim 6, wherein the connection part has one or more passage holes for screws to pass through and/or the coil part has one or more holes for receiving screws, as a result of which the connection part and the coil part can be screwed relative to one another with different orientations.

8. The magnet coil arrangement according to claim 7, wherein the holes in the coil part are arranged in a pitch circle which surrounds the contact elements.

9. The magnet coil arrangement according to claim 7, wherein the passage holes in the connection part are arranged in a pitch circle which surrounds the contact elements.

10. The magnet coil arrangement according to claim 1, wherein the connection part has an outer collar which can be inserted substantially flush into a collar receptacle of the coil part.

11. A magnet coil arrangement for electromagnetically operated valves, comprising:
    an encapsulated coil which can be electrically connected to a current source by means of a base, said base including a connection part and a coil part fixed to the coil;
    the connection part having an outer collar which can be inserted substantially flush into a collar receptacle of the coil part;

current paths passing through the connection part and the coil part, the current paths of the connection part being electrically connected to the current source, and the current paths of the coil part and electrically connected to the coil; and a connecting apparatus configured to electrically and mechanically connect the connection part and the coil part, wherein the outer collar of the connection part has a centering projection on a side which faces the coil part, said centering projection configured to enter a hole in the coil part.

12. The magnet coil arrangement according to claim 1, wherein a sealing ring configured to seal off the current paths is arranged between the connection part and the coil part.

13. The magnet coil arrangement according to claim 1, wherein:

the magnet coil arrangement is one of a plurality of magnet coil arrangements, the coil parts of the plurality of magnet coil arrangements are of different sizes and/or the connection parts have different electrical connections for the current source, and the electrical and/or mechanical connection between the coil part and the connection part is identical in all the magnet coil arrangements.

* * * * *